(12) United States Patent
Kleen

(10) Patent No.: US 7,820,954 B2
(45) Date of Patent: Oct. 26, 2010

(54) DEVICE FOR GENERATING A VIEW OF A THREE-DIMENSIONAL OBJECT

(75) Inventor: Martin Kleen, Neunkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/044,888

(22) Filed: Jan. 27, 2005

(65) Prior Publication Data

US 2005/0162440 A1 Jul. 28, 2005

(30) Foreign Application Priority Data

Jan. 28, 2004 (DE) .................. 10 2004 004 296

(51) Int. Cl.
*G01J 1/32* (2006.01)
*H01J 3/14* (2006.01)

(52) U.S. Cl. .................. 250/205; 250/216

(58) Field of Classification Search .......... 250/205, 250/208.1, 239, 214 VT, 216; 372/50.12, 372/50.122, 50.23; 378/41; 362/553, 259; 345/419, 6, 426, 32, 41; 359/458, 462–477; 348/42–60; 349/5, 15; 353/7
See application file for complete search history.

(56) References Cited

U.S. PATENT DOCUMENTS

| | | | | |
|---|---|---|---|---|
| 4,959,641 A | * | 9/1990 | Bass et al. ............... | 345/6 |
| 5,325,386 A | * | 6/1994 | Jewell et al. ............ | 372/50.124 |
| 5,479,185 A | * | 12/1995 | Biverot .................... | 345/6 |
| 5,982,342 A | * | 11/1999 | Iwata et al. ............... | 345/7 |
| 6,212,007 B1 | | 4/2001 | Hentschke | |
| 6,552,697 B1 | | 4/2003 | Oluta | |
| 6,606,078 B2 | * | 8/2003 | Son et al. ................ | 345/6 |
| 6,813,083 B2 | * | 11/2004 | Kobayashi ............... | 359/619 |
| 6,816,158 B1 | * | 11/2004 | Lemelson et al. ........ | 345/419 |
| 6,876,724 B2 | * | 4/2005 | Zhou et al. .............. | 378/122 |
| 7,050,020 B2 | * | 5/2006 | Uehara et al. ............ | 345/6 |
| 7,646,451 B2 | * | 1/2010 | Vogel et al. .............. | 349/70 |
| 2001/0028356 A1 | | 10/2001 | Balogh | |
| 2004/0150767 A1 | * | 8/2004 | Kim ....................... | 349/74 |
| 2005/0007302 A1 | * | 1/2005 | Hattori et al. ............ | 345/6 |
| 2005/0030308 A1 | * | 2/2005 | Takaki ..................... | 345/419 |

FOREIGN PATENT DOCUMENTS

| | | |
|---|---|---|
| EP | 0 262 955 | 4/1988 |
| JP | 63090289 A | 4/1988 |
| JP | 08272009 A | 10/1996 |
| JP | 2000298293 A | 10/2000 |

* cited by examiner

*Primary Examiner*—Que T Le
*Assistant Examiner*—Pascal M Bui-Pho

(57) ABSTRACT

A device for reproducing three-dimensional data has a plurality of image points(7) that include a plurality of laser light sources(2), in front of which is arranged a lens(4). Since the laser light sources(2) of an image point(7) radiate in different directions, different images can be projected in different radiation directions(12, 13). Since eyes (10, 11) of an observer perceive different images depending on the viewing direction, a spatial visual impression is produced.

13 Claims, 2 Drawing Sheets

US 7,820,954 B2

DEVICE FOR GENERATING A VIEW OF A THREE-DIMENSIONAL OBJECT

CROSS REFERENCE TO RELATED APPLICATIONS

This application claims priority to the German application No. 10 2004 004 296.9, filed Jan. 28, 2004 which is incorporated by reference herein in its entirety.

FIELD OF INVENTION

The invention relates to a device for generating a view having spatial impression of a spatial object, comprising:

a plurality of adjacently arranged light source groups which are assigned in each case to an image point of the view and which include a plurality of light sources that emit predominantly in a specific radiation direction in each case, said light sources being assigned in each case to the different radiation directions, and comprising a control unit which controls the light sources that are assigned to a specific radiation direction in accordance with the view of the spatial object in radiation direction.

BACKGROUND OF INVENTION

Such a device is known from US 2001/0028356 A1. In the known device, light-emitting diodes are arranged adjacently on a semiconductor chip. The light which is emitted by the light-emitting diodes is collimated by a lens element, said lens element being arranged in radiation direction in front of the semiconductor chip, and is transmitted in the different radiation directions. As a result of the reproduction of different views of a spatial object in the different radiation directions, it is possible to communicate a spatial visual impression of the object which must be displayed.

Another such device is known from EP 0 262 955 A2. This device likewise features adjacently arranged light-emitting diodes. The light which is emitted by the light-emitting diodes is collimated by small lenses that are arranged in radiation direction in front of the light-emitting diodes. Using this device, the collimated light is once again transmitted in different radiation directions. As a result of the activation of different light-emitting diodes, it is likewise possible to communicate a spatial visual impression.

SUMMARY OF INVENTION

A disadvantage of the known devices is that the manufacture in miniaturized form of the optical elements which are used for the collimation is difficult. Even small absolute errors in the shaping of the optical elements cause significant relative errors which result in blurred images.

The invention addresses the problem of specifying a device which makes it possible to generate views of spatial objects, said views having spatial impression and being largely free of blurring.

This object is achieved by the claims. Advantageous embodiments and developments are specified in the dependent claims.

In this device, the light which is emitted by the light-emitting diodes is concentrated into beams. In each case, the beams partially illuminate an optical element which is arranged in radiation direction in front of the relevant light source group, said optical element providing the deflection of the beams in the relevant radiation direction.

In the device, therefore, the beams which leave the light sources hit a small area of the optical element. If the deflection properties are aberrant, the deflection of the beam consequently deviates from the reference value. As a result, the perceived image is distorted. Blurring does not occur, however.

However, distortion of the image can be compensated by means of a corresponding calibration of the display. By contrast, the prior art does not provide for the correction of blurring. In order to avoid the problem of blurring, therefore, the invention accepts a distortion which can nevertheless be corrected with the aid of a calibration.

In one embodiment, the expansion of the beams transversely to the radiation direction is limited by screens of the light sources. Since the output power is not limited by additional screens, the full output power of the light sources is available for the image.

In a preferred embodiment of the device, the light sources take the form of surface-emitting lasers. Significant quantities of such surface-emitting lasers just 3 µm apart can be configured on a semiconductor chip.

It is therefore possible to produce significant quantities of light source groups having limited spatial expansion, and to arrange these adjacently in an array.

BRIEF DESCRIPTION OF THE DRAWINGS

Further details and advantages of the invention are evident from the following description, in which exemplary embodiments of the invention are explained in detail with reference to the appended drawing, in which.

DETAILED DESCRIPTION OF INVENTION

Figure 1:
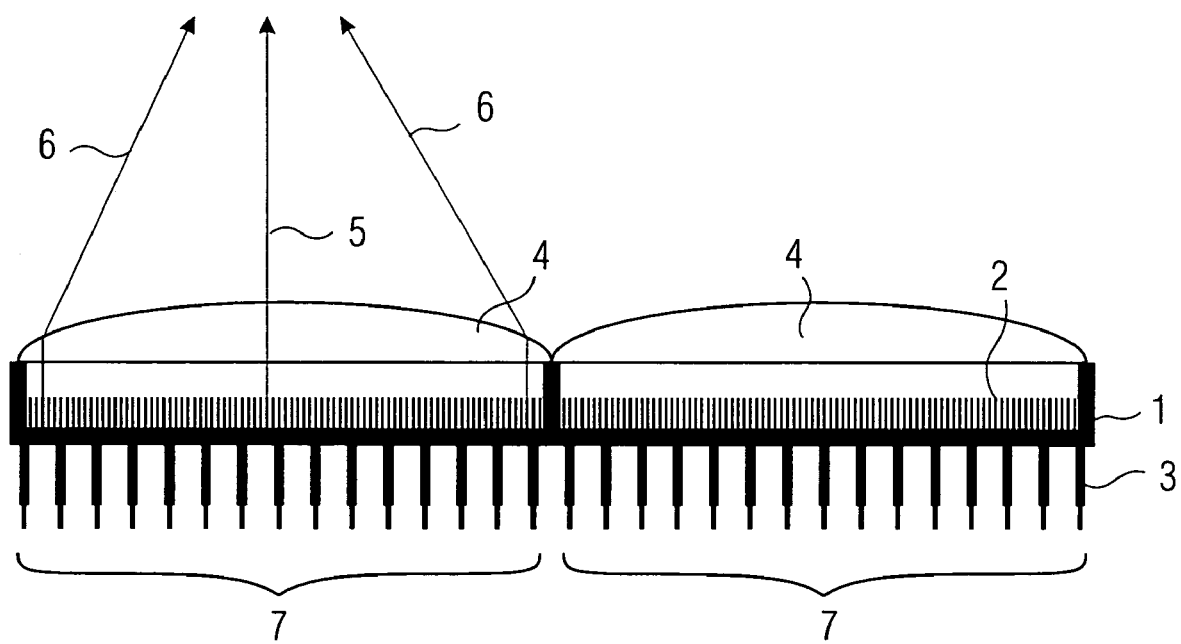
FIG. 1 shows a cross section through a semiconductor chip, on whose surface a plurality of laser elements are configured.

FIG. 1 shows a semiconductor chip 1, on whose surface are configured a plurality of adjacently arranged laser elements 2. The laser elements 2 are preferably so-called surface-emitting lasers, which are also known by the designation VCSELs (=Vertical Cavity Surface Emitting Lasers). These lasers can be adjacently arranged 3 µm apart on a semiconductor chip. Therefore approximately 1000 laser elements 2 can be placed on a square millimeter of a semiconductor chip. Contact pins 3 are configured on the underside of the semiconductor chip 1 and are used for activating the laser elements 2. The individual laser elements 2 can be activated and their intensity adjusted by the contact pins 3.

Lenses 4 are arranged above the semiconductor chip 1 and are used for the deflection of the light which is emitted by the laser elements 2. A central laser beam 5 passes through the lenses 4 essentially without deflection. Outer laser beams 6 are significantly deflected.

The laser beams 2 which are transmitted by the laser elements 2 preferably have a narrow beam divergence of less than 15°. Therefore the laser beams 5 and 6 which are transmitted by the laser elements 2 hit the lens 4 adjacently and only illuminate a part of the lens 4. As a result, the lateral expansion of the laser beams 5 and 6 which leave the lens 4 is limited by screens which are assigned to the individual laser elements 2 and not by the sideways expansion of the lens 4. The expansion of the laser beams 5 and 6 is therefore limited not by the aperture of the lens 4, but by the aperture of the laser elements 2. An embodiment of such screen devices is identified in FIG. 2.

The laser elements 2 underneath a lens element 2 represent an image point 7 of the view of the object 17 which must be displayed. Since the laser beams 5 and 6 run in different directions, the observer receives different images depending on the viewing direction to the semiconductor chip 1 if the laser elements 2 underneath the lenses 4 illuminate with different intensity.

Figure 2:
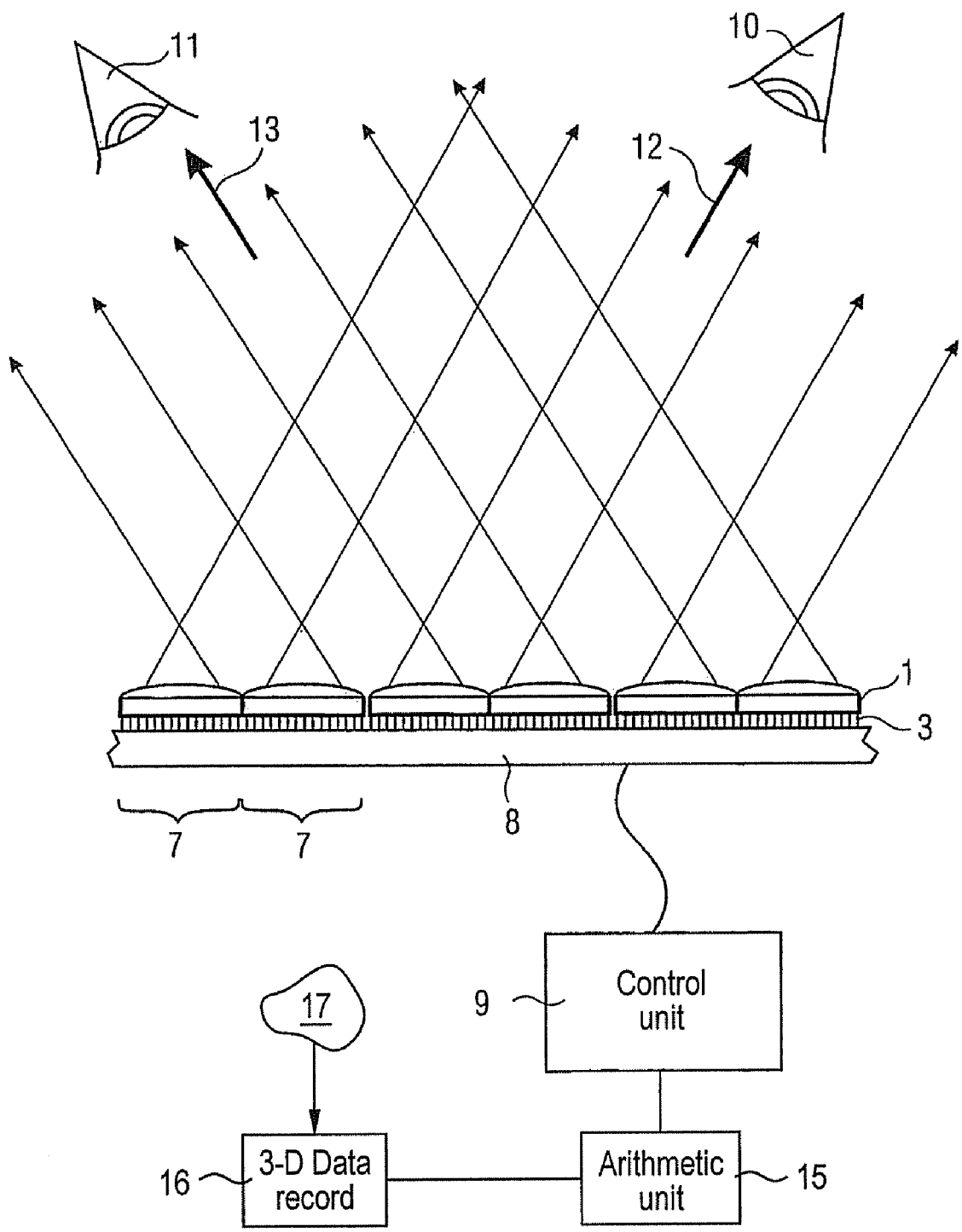
FIG. 2 shows a cross section through a device for displaying spatial objects in three dimensions.

This is clarified again in detail with reference to FIG. 2. According to FIG. 2, an array of semiconductor chips 1 is arranged on a printed circuit board 8 which is connected to a control unit 9. The laser elements 2 are associated with screen devices 14 (here identified between adjacent laser elements 2) to limit their respective apertures and are activated by the control unit 9 in such a way that eyes 10 and 11 of an observer receive an image which corresponds to the radiation directions 12 and 13 respectively. Depending on the viewing direction of the eyes 10 and 11, different laser elements 2 are perceived in the individual image points 7. By controlling the intensity of the relevant laser elements 2 accordingly, it is possible to communicate different views of the subject which must be displayed to the eyes 10 and 11 which are looking at the semiconductor chip 1 from a specific viewing direction.

Since the eyes 10 or 11 of an observer are spatially separated from each other, both eyes simultaneously perceive different images of the subject which must be displayed. A binocular visual impression is thus generated.

It is particularly advantageous that when the head of the observer moves, the observer additionally perceives a correspondingly changed display, without having to undertake corresponding inputs to display software. Moreover, the displayed image can be viewed and spatially perceived by a plurality of observers simultaneously.

It is also emphasized that the three-dimensional impression of the displayed object is generated without the observer requiring further technical resources, e.g. special glasses or similar facilities.

A further advantage of the device which is described here is that the spatial object can be viewed simultaneously by a plurality of observers, and that they receive a spatial impression of the object simultaneously.

Furthermore, the device which is described here has the advantage that errors in the manufacture of the lenses 4 only result in a distortion of the image, since the observer who views the lenses 4 from a specific radiation direction receives a communicated image that actually corresponds to a different viewing direction. However, this distortion of the displayed image can be corrected by means of a correspondingly modified activation of the laser elements 2, wherein those laser elements 2 whose laser beam 5 or 6 actually leaves the lens 4 in the desired radiation direction are activated in each case. The modifications which are required when activating the laser elements 2 can be determined in advance by means of a calibration.

The images which are generated by the control unit 9 are preferably calculated from a three-dimensional data record 16 by an arithmetic unit 15. After the arithmetic unit has calculated the images which must be displayed, and the control unit 9 has adjusted the laser elements 2 accordingly, the adjustment can remain until the observer wishes to observe the displayed spatial subject 17 from an angle which exceeds the maximal deflection angle of the laser beams 5 and 6. In this case, it is then necessary to calculate new images. However, the computing effort involved in the continuous recalculation of images for every small movement is not required.

It is noted that in the case of a modified embodiment, an active filter can be arranged between the laser elements 2 and the lenses 4, thereby allowing a display in different colors. Such an active filter can be produced on the basis of liquid crystals, for example.

It is also possible to replace the individual laser elements 2 with incoherent light sources, provided a preferred direction exists when emitting the radiated light.

The device which is described here is particularly suitable for displaying three-dimensional data records which have been recorded in the context of X-ray tomography. In particular, the three-dimensional display enables medical personnel to make a realistic image of the conditions inside the body of a patient.

The invention claimed is:

1. A device for generating a view of a three-dimensional object, comprising:
   a plurality of adjacently arranged light source groups, each light source group assigned to an image pixel of the view and comprising a plurality of light sources, each of said light sources assigned to a respective deflected beam direction, the deflected beam directions so dimensioned relative to one another so as to provide different views of the object to two eyes of an observer, or to a plurality of observers simultaneously; and
   a control unit that controls the light sources to produce a respective different view of the three-dimensional object as seen in each respective deflected beam direction, wherein
   each light source emits a respective emitted beam diverging less than 15 degrees from an emitting direction and partially illuminating an optical lens arranged in front of the respective light source group, the optical lens deflecting the emitted beams into the respective deflected beam directions;
   wherein the intensity of each of the light sources is controlled individually by the control unit to generate the respective different views; and
   wherein adjacent ones of the emitted beams of a given pixel only illuminate respective adjacent portions of an aperture of the optical lens.

2. The device as claimed in claim 1, wherein the light sources emit laser radiation.

3. The device as claimed in claim 2, wherein the light sources are surface emitting semiconductor lasers.

4. The device as claimed in claim 1, further comprising an active color filter arranged between the light sources and the optical lens.

5. The device as claimed in claim 1, wherein each of the light sources is controlled according to an actual respective deflected beam direction resulting from the optical lens.

6. A method of displaying a view of a three-dimensional medical data record, comprising utilizing a view displaying device, the view displaying device comprising:
   a plurality of adjacently arranged light source groups, each light source group assigned to an image pixel of the view and comprising a plurality of light sources, each of said light sources assigned to a respective deflected beam direction, the deflected beam directions so dimensioned relative to one another so as to provide different views of the object to two eyes of an observer, or to a plurality of observers simultaneously; and
   a control unit for controlling the respective light sources to produce a respective different view of the three-dimensional object of the medical data record as seen in each respective deflected beam direction, wherein each light source emits a respective emitted beam diverging less than 15 degrees from an emitting direction and partially illuminating an optical lens arranged in front of the respective light source group, the optical lens deflecting the emitted beams into the respective deflected beam directions;

wherein the intensity of each of the light sources is controlled individually by the control unit to generate the respective different views; and wherein adjacent ones of the emitted beams of a given pixel only illuminate respective adjacent portions of an aperture of the optical lens.

7. The device as claimed in claim 6, wherein each of the light sources is controlled according to an actual respective deflected beam direction resulting from the optical lens.

8. A device for displaying a three-dimensional view of a spatial object, comprising:

an array of pixels in a display device;

each of the pixels comprising an array of adjacent light emitters;

each of the light emitters emitting a beam of light that diverges less than 15 degrees from a forward radiation direction;

each of the beams individually intensity-controllable;

an optical lens positioned in front of each of the pixels;

each optical lens deflecting each emitted beam of a given pixel to an individually deflected beam direction, projecting a plurality of appearances of each pixel to a respective plurality of viewpoints;

wherein adjacent emitted beams of a given pixel only illuminate a respective adjacent part of the optical lens;

wherein the intensities of the emitted beams are individually controlled so that the appearances of the pixels change with changing viewpoint to display a three-dimensional view of a spatial object when viewed over a range of angles by one or more observers positioned generally in front of the device.

9. The device as claimed in claim 8, wherein each emitter comprises a laser device that emits a laser beam.

10. The device as claimed in claim 8 wherein each optical lens comprises a refractive lens.

11. The device as claimed in claim 10, wherein each optical lens comprises a single optical lens defining a respective pixel.

12. The device as claimed in claim 8, further comprising an active color filter arranged between the light emitters and the optical lens.

13. The device as claimed in claim 8, wherein each beam is controlled according to an actual individually deflected beam direction resulting from the respective part of the optical lens.

* * * * *